(12) United States Patent
Miller

(10) Patent No.: US 6,595,526 B1
(45) Date of Patent: Jul. 22, 2003

(54) ANIMAL DRAWN ADJUSTABLE IMPLEMENT CART

(76) Inventor: Monty M. Miller, 1302 County Line Rd., Venus, PA (US) 16364

( * ) Notice: Subject to any disclaimer, the term of this patent is extended or adjusted under 35 U.S.C. 154(b) by 0 days.

(21) Appl. No.: 10/128,705

(22) Filed: Apr. 23, 2002

(51) Int. Cl.$^7$ .................................................. B62C 5/00
(52) U.S. Cl. ........................................ 278/37; 172/431
(58) Field of Search .............................. 278/2.1, 34, 3, 278/33, 37, 81, 86, 3.1; 172/431, 776, 684.5, 434, 238, 338, 395; 280/652; 414/590, 620, 621; 297/312

(56) References Cited

U.S. PATENT DOCUMENTS

| | | | |
|---|---|---|---|
| 103,589 A | | 5/1870 | Evans |
| 211,662 A | * | 1/1879 | Hunt ........................... 172/459 |
| 473,413 A | * | 4/1892 | Bering ......................... 111/21 |
| 602,403 A | | 4/1898 | Kunkel |
| 1,378,014 A | | 5/1921 | Eger |
| 1,573,172 A | | 2/1926 | Laffey |
| 3,768,628 A | | 10/1973 | Bross ........................... 198/54 |
| 3,830,342 A | | 8/1974 | Allen ............................ 187/9 |
| 5,217,090 A | | 6/1993 | Billington, III et al. ...... 187/25 |
| 6,010,296 A | * | 1/2000 | Enders ........................ 414/346 |
| 6,386,558 B1 | * | 5/2002 | Chang ......................... 280/40 |

* cited by examiner

Primary Examiner—S. Joseph Morano
Assistant Examiner—Frantz F. Jules
(74) Attorney, Agent, or Firm—Wayne L. Lovercheck

(57) ABSTRACT

A two wheeled, height adjustable cart for pulling farm implements and maintaining a stable height for the cart relative to the field includes a pair of spaced wheels to which main frame members are connected and extend upwardly therefrom. A work platform having a seat for an operator is slidably mounted on the main frame members and selectively movable between an elevated position and a lowermost position, and attached to the work platform is the farm implement which is raised and lowered concomitant with the movement of the work platform from the elevated position to the lowermost position. Foot pedals mounted on the work platform actuate the raising of the work platform to the elevated position and the lowering of the work platform to the lowermost position. In addition, position setting mechanisms mounted on the main frame members allows the operator to set the lowermost position to which the work platform will descend, and which determines the depth the farm implement will extend into the soil, and also allows the operator to raise the work platform and the attached farm implement when both are stationary, or when the cart is stationary for undergoing maintenance.

21 Claims, 8 Drawing Sheets

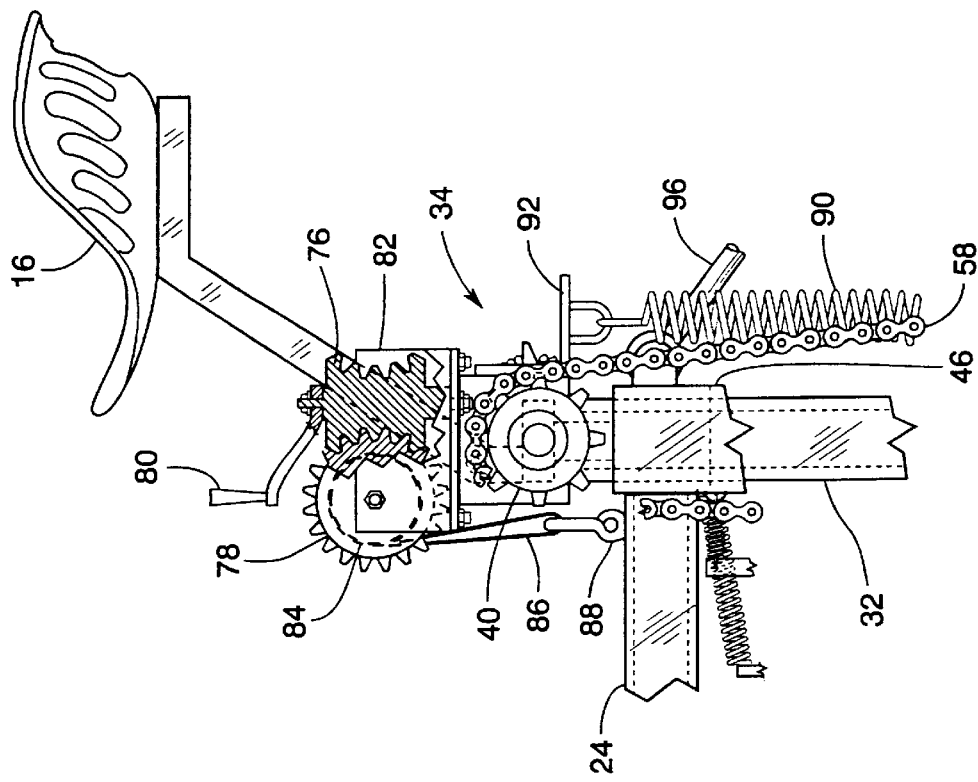
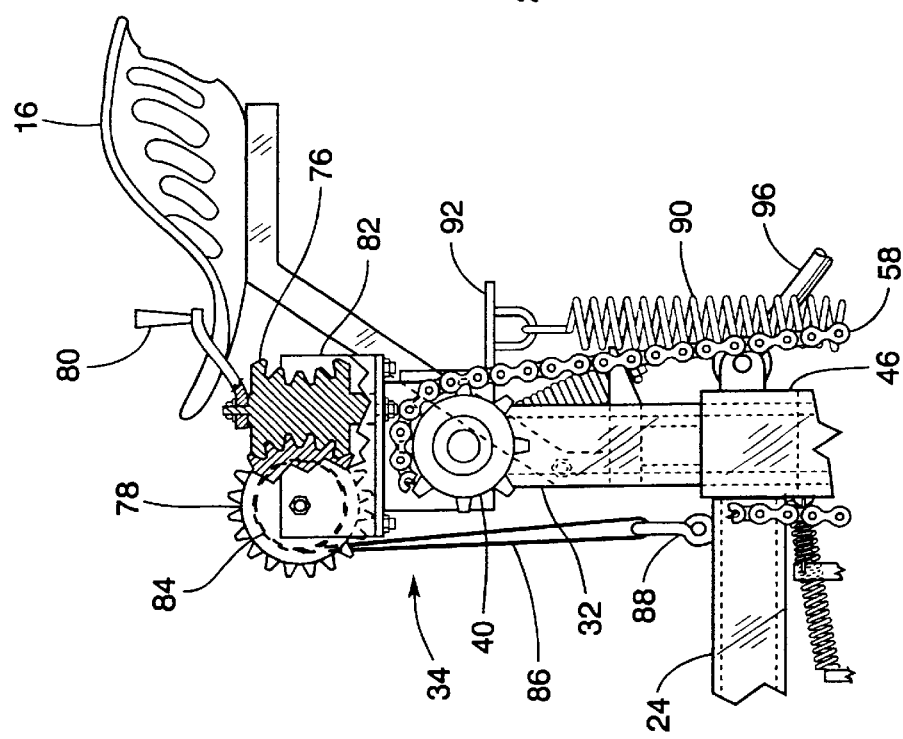

ANIMAL DRAWN ADJUSTABLE IMPLEMENT CART

CROSS REFERENCE TO RELATED APPLICATIONS

Not Applicable.

STATEMENT REGARDING FEDERALLY SPONSORED RESEARCH OR DEVELOPMENT

Not Applicable

BACKGROUND OF THE INVENTION

The present invention pertains to farm machinery, and, more particularly, pertains to an animal drawn cart for pulling farm implements and which is capable of height adjustment so that the distance of both the cart and the attached farm implement can be varied with respect to the ground.

Agricultural productivity has dramatically increased partly as a result of the wide variety of farm implements available for planting, cultivating, and harvesting the diversity of fruits, vegetables, and crops that are grown on farms for sustaining human life. By utilizing such farm machinery as combines, harrows, reapers, separators, and threshers, for example, contemporary farmers can achieve yields per acre for the crops they cultivate that far exceed previous generations. Even when the above described machinery is pulled by draft animals, such as horses or cattle, crop yields can still be obtained that surpass former times.

However, there are a number of considerations when using farm machinery pulled by draft animals that the farmer or operator must pay careful attention to in order to safely and efficiently use the farm machinery or implements, and control and direct the draft animals. Of primary concern for the operator is maintaining the stability of both the farm implement, and the cart or platform to which the farm implement is attached, as both are being pulled across and over a field during farm work so that damage and injury to the draft animals, operator and machinery can be minimized or avoided. The various carts and platforms on which the operator sits to direct and control the draft animals are subject to tipping over during field work. This is of especial concern when the implements attached to the cart are being raised, as, for example, when the operator has reached the end of one row and is raising the farm implement while the entire working unit—draft animals, cart, and farm implement—is simultaneously being turned in the reverse direction to proceed down the next row.

Thus, a long standing need exists to provide a cart or work platform that maintains its stability throughout the process of raising—and subsequent lowering—of the farm implement, is attachable to the draft animal in a safe and mechanically efficient manner, and to which a variety of farm implements can be quickly and easily attached and detached.

Two-wheeled, horse-drawn, operator seated plows or corn planters, including facility for raising and lowering the plow or corn planter are shown in U.S. Pat. No. 211,662 to Hunt, and U.S. Pat. No. 473,413 to Bering. The Patent to Bering also has a wheel-chain-sprocket arrangement for dispensing seeds from a container via wheel rotation.

BRIEF SUMMARY OF THE INVENTION

The present invention comprehends work carts or platforms that are attachable to and drawn by draft animals, and, more particularly, comprehends a farm cart or platform attachable to draft animals and to which farm implements can be attached whereupon both the cart and the farm implement can be selectively raised and lowered as a unit throughout the field work.

The height adjustable farm cart of the present invention includes a pair of main frame members that extend upwardly from the respective wheel axles of the cart. Mounted on each main frame member is an upper sprocket and a lower sprocket with the lower sprockets being coaxially mounted to the wheel axles.

Disposed on the main frame members, and capable of being raised and lowered thereon by the operator, is a work platform. The work platform includes a pair of intermediate frame members, and each intermediate frame member encompasses and is slidably mounted on each main frame member for movement up and down on the main frame members. Mounted to each intermediate frame member are a pair of intermediate idler sprockets, and the idler sprockets move with the intermediate frame members during the raising and lowering of the work platform. A continuous chain is disposed on each pair of idler sprockets and each set of upper and lower sprockets, and the chains are actuated for movement thereon by the rotation of the wheels. Both the intermediate frame members and the main frame members have pin-receiving holes and apertures that can be brought into alignment by the upward movement of the intermediate slidable members on the main frame members whereupon pins are inserted therethrough thus locking the intermediate frame members to the main frame members and maintaining the work platform in the raised position. The pins are retractable for unlocking and releasing the intermediate frame members from the main frame members thereby allowing the intermediate frame members to slide down on the main frame members so that the work platform can be disposed to the lowered position.

The work platform includes an operator's seat for the operator, and the raising and lowering of the work platform is initiated and controlled by the operator's manipulation of a brake pedal and a pin-releasing pedal. The brake pedal actuates the raising of the work platform on the main frame members, and the pin releasing pedal actuates lowering of the work platform on the main frame members by causing the retraction of the pins from the respective intermediate frame members and main frame members.

In order to avoid injury to the animal, the cart includes a raised drawbar that projects from the work platform and is securable to the draft animals—normally horses—above the area of the legs of the draft animal.

It is an objective of the present invention to provide a work cart that can be easily and quickly attached to one or more draft animals and that can be selectively raised and lowered by the operator during field work.

It is another objective of the present invention to provide a work cart to which a variety of farm implements can be attached and detached.

It is yet another objective of the present invention to provide a work cart that allows the operator to set and then change as needed the lowermost position of the work cart.

Yet another objective of the present invention is to provide a work cart wherein the work cart and the farm implement can be raised and lowered as an interconnected unit.

These and other objects, features, and advantages will become apparent from a careful inspection and reading of the ensuing detailed description, the accompanying figures, and the appended drawings.

BRIEF DESCRIPTION OF THE SEVERAL VIEWS OF THE DRAWING(S)

Figure 5:
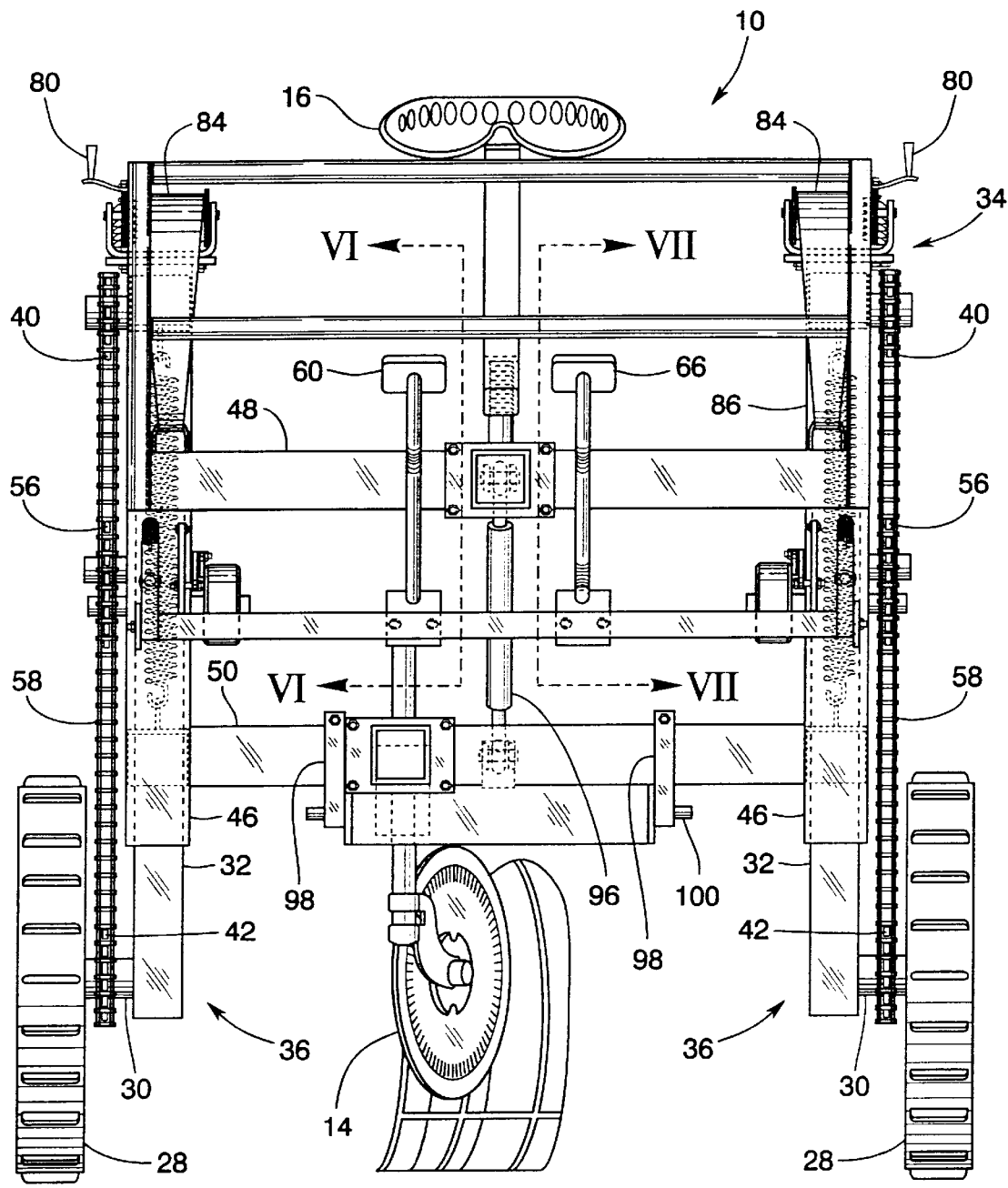
Figure 6:
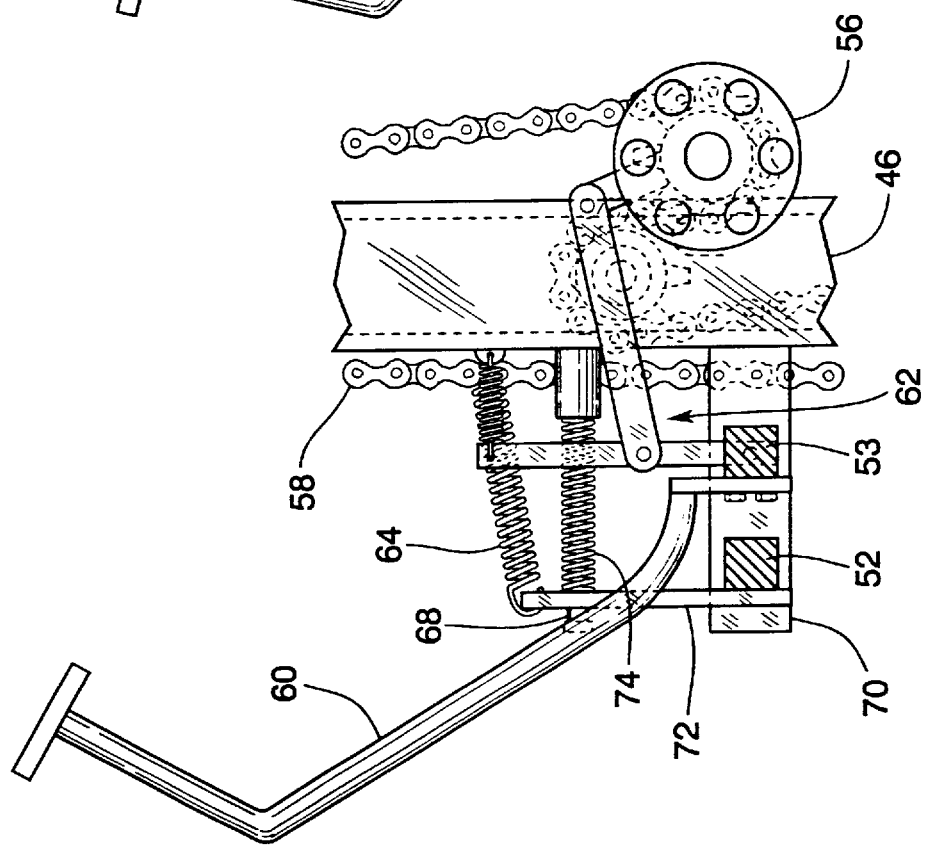

FIG. 5 is a front elevational view of the farm cart illustrating the position setting mechanism that sets the lowermost position to which the farm cart can descend and the two control pedals, the brake pedal and the pin releasing pedal FIG. 6 is a sectioned elevational view of the brake pedal taken along lines VI—VI of FIG. 5 illustrating the disposition of the brake pedal in the non-engaged state.

Figure 7:
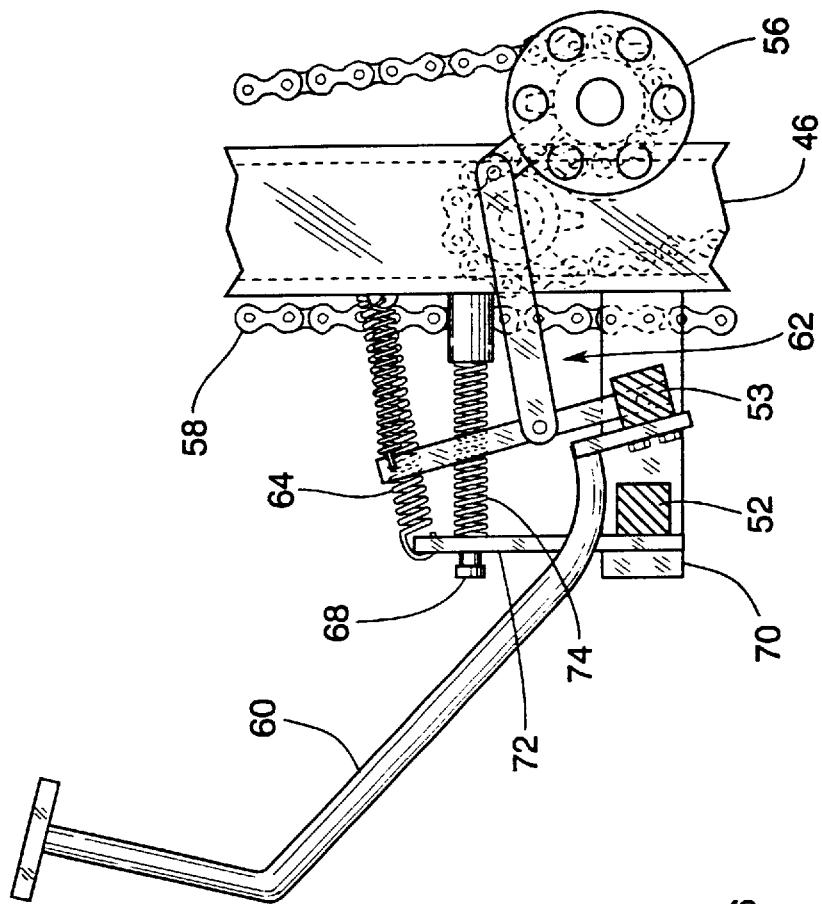

FIG. 7 is a sectioned elevational view of the brake pedal taken along lines VI—VI of FIG. 5 illustrating the depression of the brake pedal for actuating the raising of the work cart to the elevated position.

Figure 8:
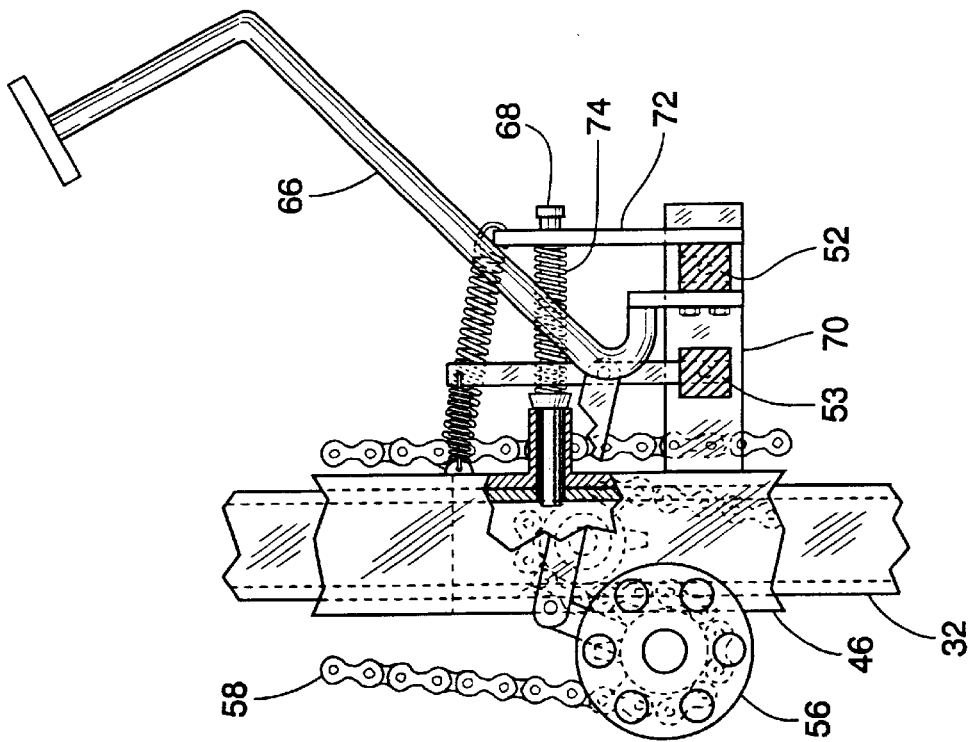

FIG. 8 is a sectioned elevational view of the pin-releasing pedal taken along lines VII—VII of FIG. 5 illustrating the position of the pin releasing pedal in the non-engaged state for maintaining the work cart in the elevated position.

Figure 9:
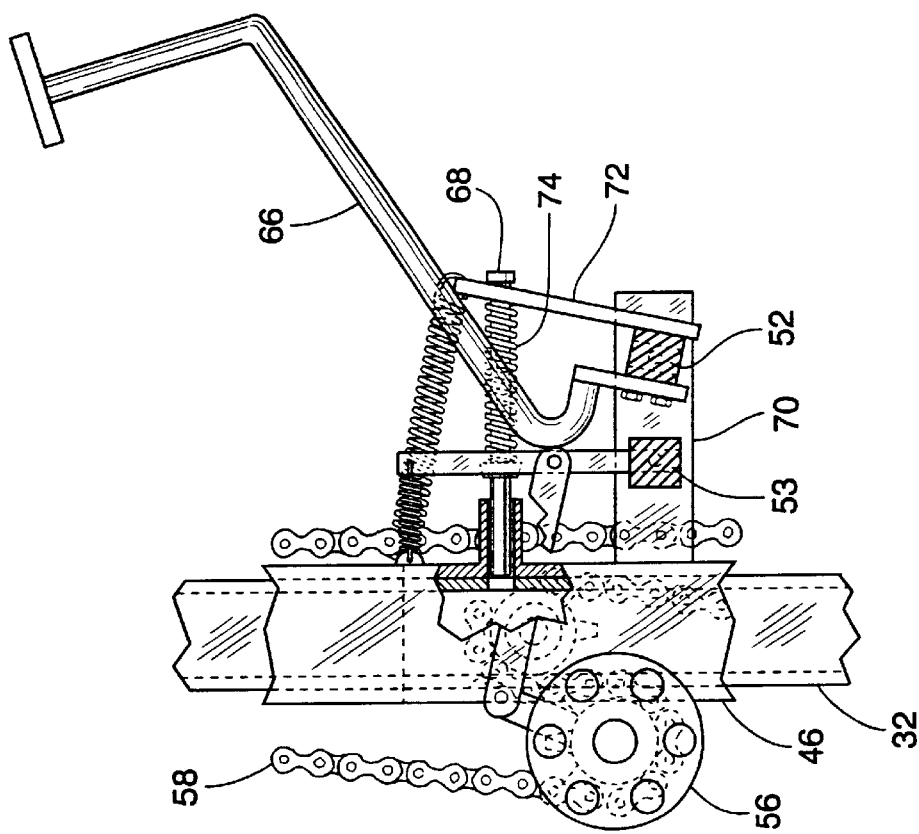

FIG. 9 is a sectioned elevational view of the pin-releasing pedal taken along lines VII—VII of FIG. 5 illustrating the depression of the pin releasing pedal and retraction of the pins for allowing the work cart to descend to the lowermost position.

Figure 1:
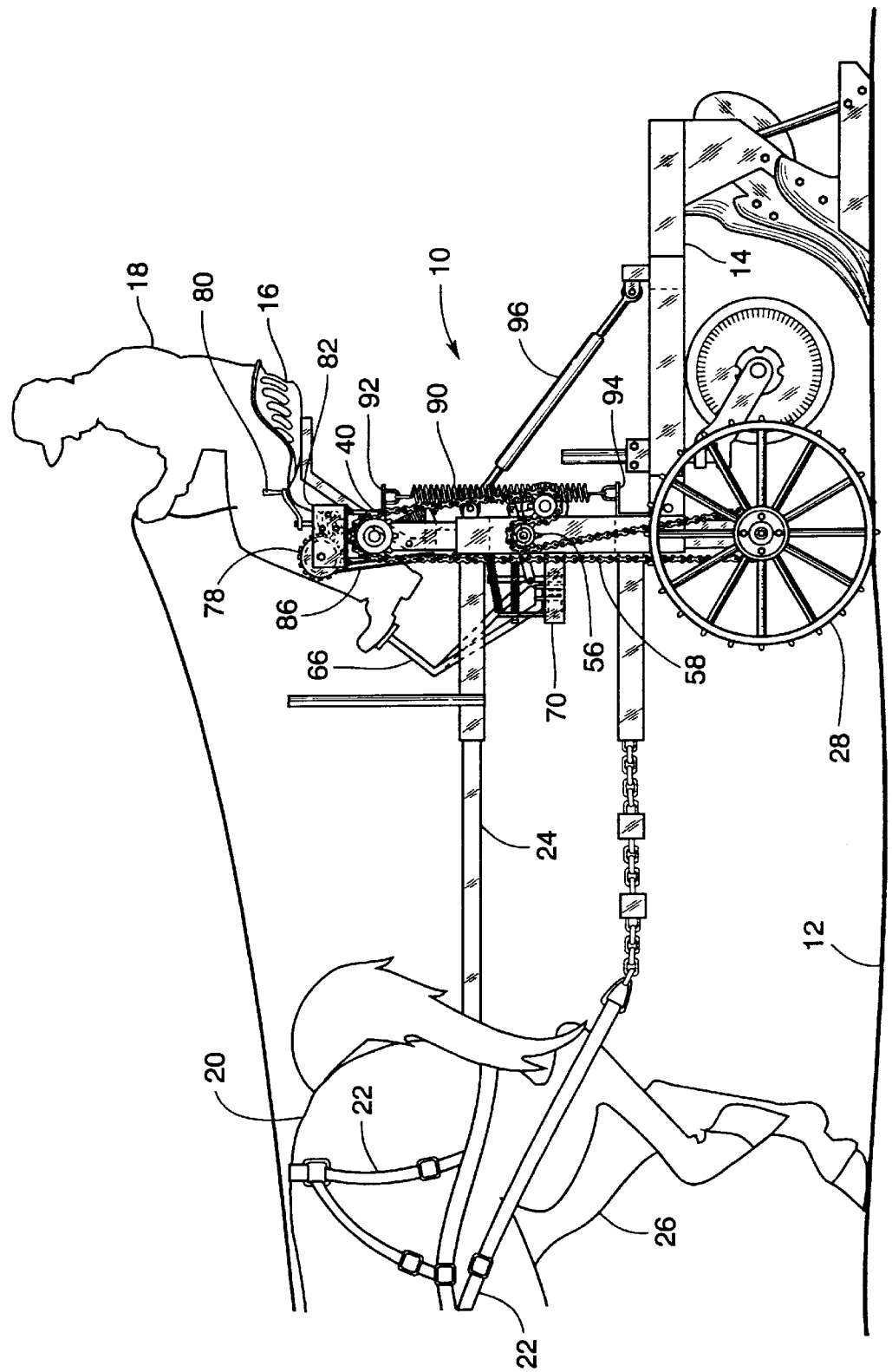
FIG. 1 is a side elevational view of the farm cart of the present invention shown attached to a horse and to which a disc and plow unit is connected.
Figure 2:
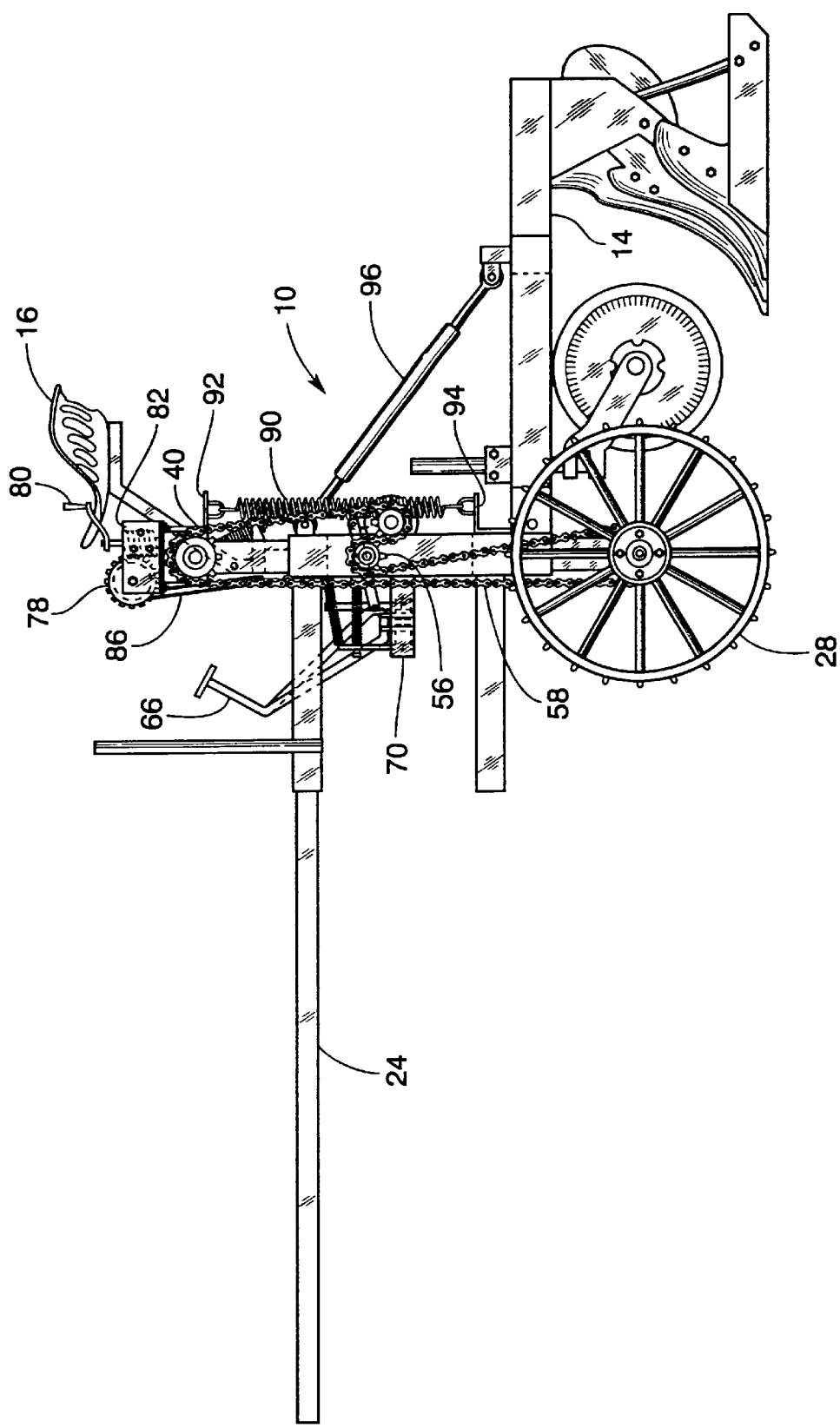
FIG. 2 is a side elevational view of the farm cart first shown in FIG. 1 showing the farm cart in the detached mode and illustrating the horizontal extension of the drawbar.
Figure 3:
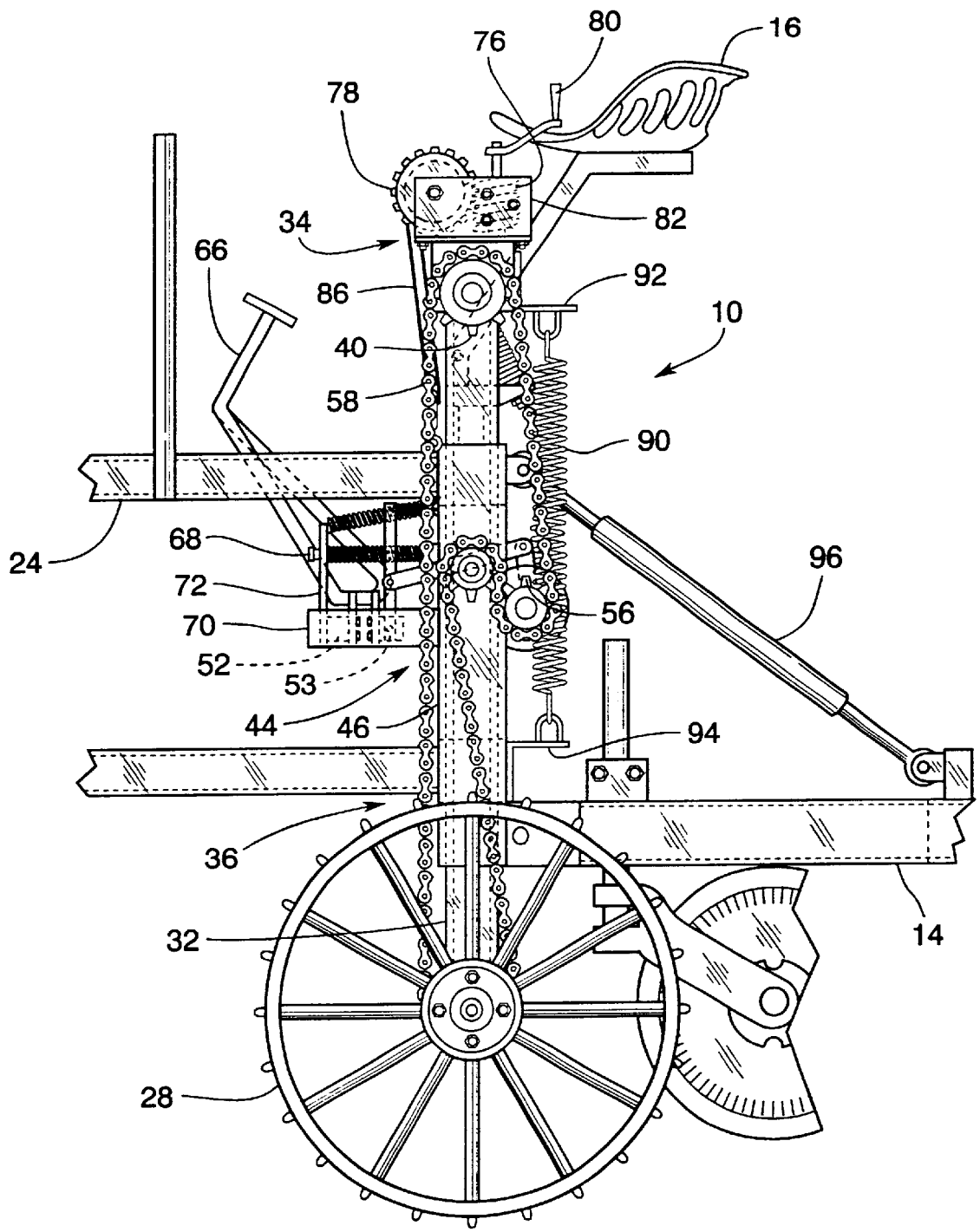
FIG. 3 is a sectioned elevational view of the farm cart illustrating the disposition of the farm cart to the lowermost position.

FIG. 10 is a sectioned elevational view of the operator's seat and upper end of the work cart first shown in FIG. 1 illustrating one particular setting achievable by the position setting mechanism.

FIG. 11 is a sectioned elevational view of the operator's seat and the upper end of the work cart first shown in FIG. 1 illustrating a second setting achievable by the position setting mechanism.

DETAILED DESCRIPTION OF THE INVENTION

Illustrated in FIGS. 1 through 11 is agricultural work platform or farm cart 10 capable of selective height adjustment to achieve and maintain a stable vertical height with respect to ground 12 and the particular farm implement that is attached to farm cart 10. A variety of farm implements are attachable to the rear of cart 10, and by way of example, a plow and disc unit 14 are shown as being secured to cart 10 in FIGS. 1 and 2 for plowing a field. Cart 10 includes operator's seat 16 as shown in FIGS. 1 through 5 for operator 18 to sit on for manually controlling cart 10. Cart 10 is attachable to a draft animal, such as horse 20 as shown in FIG. 1, by several straps or harnesses 22, and also by raised drawbar 24. Drawbar 24 attaches to horse 20 above legs 26 of horse 20 thereby avoiding injury to legs 26 of horse 20.

As shown in FIGS. 1 through 5, 8, and 9, cart 10 includes a pair of spaced-apart wheels 28 that can be either rubber or steel. Wheels 28 ride in the previously formed furrows. Each wheel 28 has inwardly projecting stub or axle 30, and mounted on axles 30, and extending upwardly therefrom, are a pair of main stanchions or main frame members 32. Each main frame member 32 has upper end 34 and opposite lower end 36 journaled to axles 30, and main frame members 32 extend upwardly in the same vertical plane. Further, each main frame member 32 includes at least one main frame aperture 38 located toward upper end 34 thereof. In addition, secured to upper end 34 of each main frame member 32 is upper sprocket 40 and secured to each axle 30 between wheel 28 and the respective lower end 36 of each main frame member 32 is lower sprocket 42.

Illustrated in FIGS. 1 through 5 is variable height adjustable work platform 44 slidably mounted on main frame members 32 and which is capable of being manually actuated for movement between a raised or elevated position and a lowermost position. Height adjustable work platform 44 has a number of features that permits operator 18 to selectively raise and lower work platform 44 while cart 10 is attached to and being pulled by horse 20 during field work in order to maintain the stability of cart 10 at all times, especially while working on rough and uneven ground and while turning and reversing directions at the ends of rows. It should be noted that wheels 28 provide the lifting power for raising both work platform 44 and any attached farm implement.

As shown in FIGS. 1 through 5 and 8 through 11, work platform 44 includes a pair of spaced-apart intermediate frame members 46. Each intermediate frame member 46 is slidably mounted on each respective main frame member 32 and thus intermediate frame members 46 encompass main frame members 32 but are shorter in length than main frame members 32 on which they are mounted. Intermediate frame members 46 are interconnected, as shown in FIG. 5, by several horizontally extending structural members, specifically by upper support bar 48 and lower support bar 50 so that intermediate frame members 46 slide as a unitary structure on main frame members 32. Also, each intermediate frame member 46 includes at least one receiving hole 54 generally having the same diameter as each main frame aperture 38, and each receiving hole 54 is capable of being selectively aligned and misaligned with the corresponding main frame apertures 38 by the slidable upward and downward movement of intermediate frame members 46 on main frame members 32 as part of the process of raising and lowering work platform 44. Rotatable cross members 52 and 53 extend generally horizontally between intermediate frame members 46 and are rotatably supported thereon. Brake pedal 60 is supported on cross member 53 and pin-releasing pedal 66 is supported on cross member 52.

Secured to each intermediate frame member 46 are a pair of intermediate idler sprockets 56, and each pair of idler sprockets 56 are located in the same vertical plane as upper and lower sprockets 40 and 42 that are mounted to each respective main frame member 38 as shown in FIG. 5. Each pair of idler sprockets 56 moves concomitant with the slidable up and down movement of intermediate frame member 46 to which they are secured; furthermore, as will be more fully described hereinafter, one idler sprocket 56 from each pair is capable of being shifted or moved from an unlocked position to a locked position in order to assist in raising the entire work platform 44 to the elevated position. Illustrated in FIGS. 1 through 5 are a pair of continuous chains 58 with each chain 58 being meshed or entrained about one set of upper and lower sprockets 40 and 42 that are mounted to each main frame member 32 and one pair of idler sprockets 56 secured to each intermediate frame member 46. Thus, during normal operation of cart 10 each chain 58 runs from one upper sprocket 40 down to the corresponding lower sprocket 42 attached to wheel axle 30 and which is rotated thereby, and then up and about the two adjacent idler sprockets 56 and back to upper sprocket 40 completing the counterclockwise circuit.

As shown in FIGS. 1 through 7, idler sprocket 56 from each pair that is capable of selective movement from an unlocked to a locked state is interconnected to brake pedal 60 by linkage arrangement 62 and brake return spring 64. For the purpose of orientation, and with reference to FIGS. 5 through 9, standing at the rear of cart 10 and looking forward toward drawbar 24 and horse 20, two pedals are mounted to connecting cross members 52 and 53, a right pedal and a left pedal. The right pedal is brake pedal 60, attached to cross member 53; the left pedal will be hereinafter further described. When brake pedal 60 is in the disengaged state, as shown in FIG. 6, each movable idler sprocket 56 is in the unlocked position; depression of brake pedal 60 rotates cross member 53, as shown in FIG. 7, which moves the idler sprocket 56 to the locked position which, in part, facilitates the raising of work platform 44.

With reference to FIGS. 8 and 9, the left pedal is pin-releasing pedal 66 that is engaged by operator 18 to rotate cross member 52 and unlock and release intermediate frame members 46 from main frame members 32 so that intermediate frame members 46 can slide downward and upward on main frame members 32 for disposing work platform 44 to either the lowermost position or the elevated position. Specifically, a pair of locking and releasing pins 68 are mounted to connecting cross member 52 by pin-mounting plate 70 and each pin 68 is maintained in its perpendicular orientation with respect to intermediate frame member 46 and main frame member 32 by pin guide plate 72 that is mounted to and extends upwardly from each pin mounting plate 70. Each pin 68 is spring-biased by compression spring 74 to assist in the insertion and retraction of each pin 68 from each pair of cooperating main frame apertures 38 and receiving holes 54 of the respective main frame members 32 and intermediate frame members 46. In FIG. 8 pin-releasing pedal 66 is in the non-depressed position and pins 68 are inserted into the respective apertures 38 and holes 54 to lock intermediate frame members 46 to main frame members 32 for maintaining work platform 44 in the elevated position. FIG. 9 illustrates pin-releasing pedal 66 in the depressed state for actuating the retraction of pins 68 from apertures 38 and receiving holes 54 thereby releasing intermediate frame members 46 from main frame members 32 for allowing intermediate frame members 46 to slide downward on main frame members 32 so that work platform 44 can be disposed to the lowermost position.

Illustrated in FIGS. 1 through 5, 10 and 11 are a pair of hand operable mechanisms that allow operator 18 to vary the lowermost position to which work platform 44 can descend. This is advantageous in so far as different farm implements must penetrate the soil at different depths to achieve their working effectiveness. For example, plows generally need to cut at least 7 inches into the soil. Also, depending upon such factors as the slope of the field and the particular season, different farm implements will require different levels of penetration. The hand operable mechanisms are manually adjustable work platform position setting mechanisms and include worm 76 and worm gear 78 mounted at upper end 34 of each main frame member 32. Hand operable crank 80 projecting from each worm 76 is used to rotate worm 76, and both sets of worm 76 and worm gear 78 units are partially enclosed within a protective shield or container 82. A spool or drum 84 is rotatably mounted to each worm gear 78 and rotates coincident with the rotation of worm gear 78, and disposed on drum 84 is flexible strap 86; specifically, the upper portion of each strap 86 is disposed on drum 84. Each strap 86 extends downwardly along upper end 34 of each main frame member 32 and has a lower portion attached to fastener 88, such as an eye bolt, and fastener 88 is secured to drawbar 24. Drawbar 24 is secured to work platform 44 and extends outwardly and horizontally therefrom.

The position setting mechanisms have two purposes: 1) to lift both work platform 44 and the farm implement while both are stationary, as, for example, during maintenance and repairs; and, 2) to set the depth the farm implement will enter the soil by turning hand cranks 80 clockwise or counter-clockwise for engaging worms 76 and worm gear 78 drives and thus shortening or lengthening straps 86. Lengthening straps 86 allows the farm implement to penetrate deeper into the soil while shortening straps 86 provides for a shallower soil penetration. In addition, lengthening straps 86 allows work platform 44 to descend farther and thus sets a lowermost position closer to ground 12 while shortening straps 86 provides for a shorter descent of work platform 44. Rotating cranks 80 to shorten straps 86 causes work platform 44 to be pulled upward on main frame members 32 and thus set the lowermost position of work platform 44 further from ground 12. Worm 76 and worm gear 78 drive mechanisms are preferably used because they don't employ a ratchet which would provide only a series of discrete positions; contrawise, worm 76 and worm gear 78 units are essentially infinitely variably adjustable between a maximum lowermost position and a maximum elevated position. Moreover, worm 76 and worm gear 78 drives can be stopped at any position therebetween and they will hold that position.

As illustrated in FIGS. 1 through 5, cart 10 includes a hitching mechanism, generally a category 1, three point hitch, for attaching and detaching the various farm implements to cart 10. The hitching mechanism includes a pivotably secured elongated rod, generally referred to as top link 96. Top link 96 extends from the farm implement to upper support bar 48 of work platform 44 and is used for stability. In addition, the hitching mechanism includes brackets or clamps 98 slidably mounted on lower support bar 50 of work platform 44, and brackets or clamps 98 are adjustable sideways therealong to accommodate and permit the attachment of various farm implements thereto. Top link 96 and the two clamps 98 provide the three hitch points for securing the farm implement to cart 10, and in order to detach the farm implement, the pins and bolts 100 must first be removed from the three hitch points.

With reference to FIGS. 1 through 9, during normal operation, the farm implement, such as plow 14 will be engaged with soil 12 and will be attached to cart 10, specifically work platform 44, and work platform 44 will be in the lowermost position as shown in FIG. 1 (however, operator 18 will not be depressing either pedal 60 and 66 at this time). Neither brake pedal 60 nor pin-releasing pedal 66 will be engaged or depressed by operator 18 during this time and pins 68 will be in the retracted state and intermediate frame members 46 will be unlocked from main frame members 32. Using the position setting mechanisms operator 18 will have pre-set the lowermost position for work platform 44.

Figure 4:
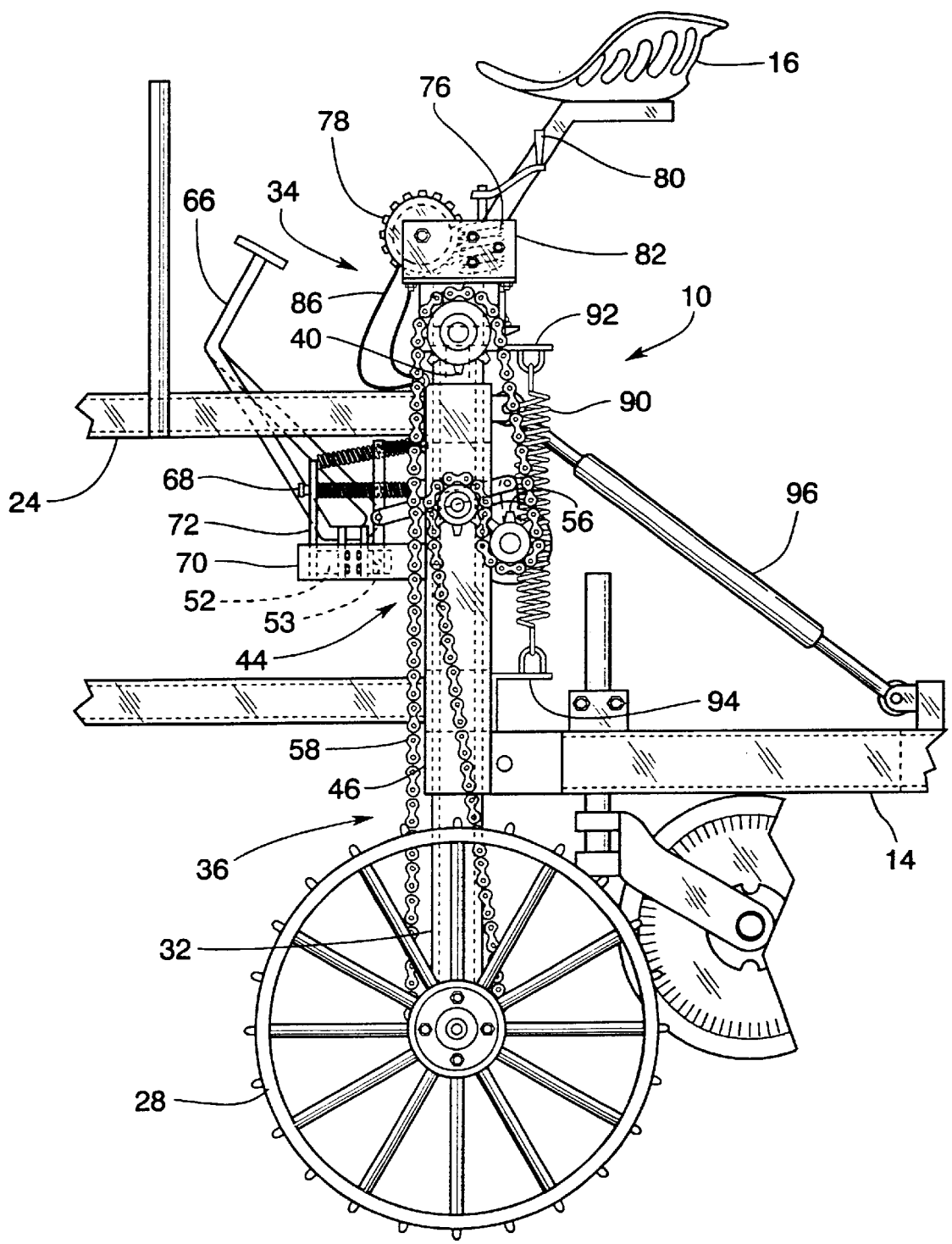
FIG. 4 is a sectioned elevational view of the farm cart illustrating the disposition of the farm cart when it has been raised to the elevated position.

As operator 18 reaches the end of the row, and before he reverses direction to come down the adjacent row in the opposite direction, operator 18 depresses brake pedal 60. This action initiates a number of mechanical actions that occur more or less simultaneously and in brief succession to raise work platform 44. Depressing brake pedal 60 prevents the free rotation of both chains 58 and at the same time causes each shiftable idler sprocket 56 on each intermediate frame member 46 to move to the locked position (shown in FIG. 7). Nonetheless, wheels 28 will continue to rotate as cart 10 is slowly moving throughout the turn, and as wheels 28 rotate they pull chains 58 down from upper sprockets 40 and simultaneously chains 58 pull upwardly on idler sprockets 56 further locking them in position. The upward movement of chains 58 along both sets of idler sprockets 56 causes intermediate frame members 46 to be pulled upward with pins 68 briefly riding along the external surface of main frame members 32. Wheels 28 and chains 58 never come to a complete stop, and the upward movement of intermediate frame members 46—and the entire work platform 44—continues until apertures 38 and holes 54 for each pair of intermediate frame members 46 and main frame members 32 come into alignment. As soon as this occurs spring-biased pins 68 are inserted through each pair of aligned holes 54 and apertures 38 thus locking intermediate frame members 46 to main frame members 32 as the elevated position of work platform 44 is now attained. FIGS. 4 and 8 clearly illustrate this position. Each helper spring 90 also assists in lifting work platform 44 simultaneous with the movement of chains 58.

When operator 18 has completed the turn and is ready to take horse 20, cart 10, and the farm implement down the adjacent row, operator 18 first depresses pin-releasing pedal 66, as shown in FIG. 9, causing the retraction of both pins 68 and unlocking intermediate slidable members 46 from main frame members 32. Work platform 44 then immediately drops to the lowermost position as shown in FIGS. 1 and 4. This drop can be somewhat dampened by operator 18 riding brake pedal 60. Operator 18 can then commence traveling down the next row. While cart 10 and the farm implement are traveling along the field, very little load is placed on idler sprockets 56, chains 58, and the brake mechanism as these elements are essentially idling along.

The foregoing description discloses and describes a preferred embodiment of the invention; those skilled in the art will understand that other variations and modifications may be possible and practicable, and may come within the ambit of the appended claims.

The embodiments of the invention in which an exclusive property or privilege is claimed are defined as follows:

1. A two wheeled, height adjustable cart for pulling farm implements, comprising:
   a pair of main frame members with each main frame member secured to each wheel axle and extending upwardly therefrom;
   a pair of intermediate frame members with each intermediate frame member slidably mounted on each respective main frame member and joined together by a connecting cross member so that the intermediate members can slide in unison on the main frame members between an elevated position and a lowermost position;
   a pair of upper sprockets with each upper sprocket mounted at the upper end of each respective main frame member;
   a pair of lower sprockets with each lower sprocket mounted to the respective wheel axles adjacent the lower end of each main frame member;
   two pairs of intermediate idler sprockets with one pair mounted to each intermediate frame member and at least one intermediate idler sprocket from each pair having a locking disposition that restricts the rotation of that intermediate idler sprocket;
   a pair of continuous chains with each continuous chain entrained on one set of upper and lower sprockets and one pair of intermediate idler sprockets and the chains being driven by the rotation of the wheels;
   a brake pedal for engaging and locking at least one intermediate idler sprocket from each pair of intermediate idler sprockets for restricting the free rotation of those intermediate idler sprockets;
   a pair of locking and releasing pins for locking each intermediate frame member to each main frame member when each intermediate frame member is moved to the elevated position and for releasing each intermediate frame member so that the intermediate frame members can descend on the main frame members to the lowermost position; and
   a pin releasing pedal interconnected to the locking and releasing pins so that depression of the pin releasing pedal causes the pins to retract from the intermediate frame members and the main frame members thus allowing the intermediate frame members to slide on the main frame members for disposition to the lowermost position.

2. The two wheeled, height adjustable cart recited in claim 1 further comprising a position setting mechanism for setting the lowermost position to which the intermediate frame members can descend relative to the main frame members.

3. The two wheeled, height adjustable cart recited in claim 2 wherein the position setting mechanism includes a pair of flexible straps with each strap having an upper strap portion for securement to the upper end of each main frame member and a lower strap portion for securement to the lower end of each main frame member.

4. The two wheeled, height adjustable cart recited in claim 3 further comprising a pair of worm gear drives with each worm gear drive being interconnected to each flexible strap and the worm gear drives being manipulable by a hand crank in order to vary and then set the lowermost position to which the intermediate frame members can descend on the main frame members.

5. The two wheeled, height adjustable cart recited in claim 4 further comprising a pair of helper springs with each helper spring having an upper spring end for attachment to each main frame member and a lower spring end for securement to each intermediate frame member for dampening the descent of the intermediate frame members on the main frame members and for assisting in lifting the intermediate frame members on the main frame members when the cart is being raised to the elevated position.

6. The two wheeled, height adjustable cart recited in claim 5 further comprising a raised drawbar for attaching the cart to the draft animal whereupon the drawbar can be attached to the draft animal above the legs of the draft animal in order to avoid injury to the legs of the draft animal.

7. A two wheeled, height adjustable work platform for pulling farm implements that perform field work, comprising:
   a pair of spaced-apart main frame members with each main frame member connected to, and extending upwardly from, the axles of each respective wheel;
   a pair of upper sprockets with each upper sprocket mounted at the upper end of each main frame member and a pair of lower sprockets with each lower sprocket rotatably mounted coaxially to each respective wheel axle adjacent the lower end of each main frame member;

the work platform for disposition on the main frame members including:
- a pair of intermediate frame members with each intermediate frame member mounted on each respective main frame member for slidable movement thereon between an elevated position and lowermost position, the intermediate slidable members interconnected by a cross bar for unitary slidable movement on the main frame members;
- two pairs of intermediate idler sprockets with each pair of intermediate idler sprockets attached to each intermediate frame member;
- a pair of continuous chains with each continuous chain entrained on one set of upper and lower sprockets and one pair of intermediate idler sprockets and the chains being rotatably driven by the rotation of the wheels;
- a brake pedal mounted to the cross bar and linked to both sets of intermediate idler sprockets so that depression of the brake pedal causes at least one intermediate idler sprocket from each pair to move into a locking position thus limiting the free rotation of the chains but not the wheels;
- a pair of locking and releasing pins for locking the intermediate frame members to the main frame members for maintaining the work platform in the elevated position and for retraction therefrom so that the work platform can descend on the main frame members to the lowermost position; and
- a pin releasing pedal mounted to the crossbar and linked to the locking and releasing pins so that depression of the pin releasing pedal actuates the retraction of the pins from the intermediate frame members and the main frame members thereby allowing the intermediate frame members to slide on the main frame members for allowing the work platform to move from the elevated position to the lowermost position.

8. The two wheeled, height adjustable work platform recited in claim 7 further comprising a pair of helper springs with each helper spring having an upper spring end secured to the respective main frame member and a lower spring end secured to the respective intermediate frame member for dampening the movement of the work platform from the elevated position to the lowermost position and for assisting in raising the work platform from the lowermost position to the elevated position.

9. The two wheeled, height adjustable work platform recited in claim 8 further comprising a pair of position setting straps with each strap capable of selective adjustment in order to vary the lowermost position to which the work platform can descend on the main frame members.

10. The two wheeled, height adjustable work platform recited in claim 9 wherein each position setting strap is flexible and has an upper strap portion for attachment to the respective main frame member and a lower strap portion for attachment to the respective intermediate frame member whereupon the flexibility of the straps facilitates the variable setting of the lowermost position to which the work platform can descend.

11. The two wheeled, height adjustable work platform recited in claim 10 wherein each main frame member includes a main frame aperture for receiving the respective locking and releasing pin.

12. The two wheeled, height adjustable work platform recited in claim 11 wherein each intermediate frame member includes a receiving hole for insertion therein of the respective locking and releasing pin.

13. The two wheeled, height adjustable work platform recited in claim 12 wherein the main frame apertures and the receiving holes are brought into alignment by the slidable movement of the intermediate frame members on the main frame members so that the pins can be inserted therethrough in order to lock the intermediate frame members to the main frame members for maintaining the work platform in the elevated position.

14. The two wheeled, height adjustable work platform recited in claim 13 further comprising a raised drawbar for attaching the draft animal to the work platform so that the drawbar can be attached to the draft animal above the legs of the draft animal thereby avoiding injury to the legs of the draft animal.

15. A two wheeled, height adjustable cart manually adjustable between an elevated position and a lowermost position for pulling work implements, comprising:
- a pair of spaced-apart main frame members mounted on and extending upwardly from the axle of each respective wheel;
- a work platform mounted on the main frame members and capable of selective reciprocable movement between the elevated position and the lowermost position in order to raise and lower the work implements and to maintain the stability of the work platform;
- the work platform including a pair of intermediate frame members with each intermediate frame member being slidably mounted on each respective main frame member for movement between the elevated position and the lowermost position and the intermediate frame members being shorter in length than the main frame members; and
- a pair of locking and releasing pins with each pin mounted to each intermediate frame member for locking the intermediate frame members to the main frame members when the work platform has been raised to the elevated position in order to maintain the work platform at the elevated position and for releasing the intermediate frame members from the main frame members so that the intermediate frame members can slide downward on the main frame members for setting the work platform at the lowermost position.

16. The two wheeled, height adjustable cart recited in claim 15 further comprising a pair of lower sprockets with each lower sprocket mounted to the axle of each wheel.

17. The two wheeled, height adjustable cart recited in claim 16 further comprising a pair of upper sprockets with each upper sprocket mounted at the upper end of each main frame member.

18. The two wheeled, height adjustable cart recited in claim 17 further comprising two pairs of intermediate idler sprockets with each pair of idler sprockets being attached to each intermediate frame member and one idler sprocket from each pair capable of being disposed to a locked position for facilitating the raising of the work platform.

19. The two wheeled, height adjustable cart recited in claim 18 further comprising a pair of continuous chains with each continuous chain entrained about one pair of intermediate idler sprockets and one set of upper and lower sprockets and drivingly actuated by the rotation of the wheels.

20. The two wheeled, height adjustable cart recited in claim 19 further comprising a brake pedal mounted to the intermediate frame members and interconnected to both pairs of idler sprockets so that depression of the brake pedal causes at least one idler sprocket of each pair to move to a locking position and thus facilitate the raising of the work platform by causing the wheels to pull the chains upward on the upper sprockets, the lower sprockets, and the idler sprockets thereby raising the work platform to the elevated position.

21. The two wheeled, height adjustable cart recited in claim 20 further comprising a pin releasing pedal mounted to the intermediate frame members and interconnected to the locking and releasing pins so that depression of the pin releasing pedal actuates the retraction of the pins from the intermediate frame members and the main frame members whereupon the intermediate frame members are able slide on the main frame members thus allowing the work platform to descend to the lowermost position.

* * * * *